3,502,493
DEPOSITION OF MICRON-SIZED PARTICLES INTO POROUS SURFACES
Clarence W. Forestek, Broadview Heights, Ohio, (% Forestek Plating & Manufacturing Co., 9607 Quincy Ave., Cleveland, Ohio 44106)
No Drawing. Continuation of application Ser. No. 522,362, Jan. 24, 1966, which is a continuation-in-part of application Ser. No. 414,423, Nov. 27, 1964. This application Sept. 20, 1968, Ser. No. 768,952
Int. Cl. B44d 1/34; B05b 7/14
U.S. Cl. 117—22      9 Claims

ABSTRACT OF THE DISCLOSURE

The invention disclosed comprises a process of deposing finely divided particles of metal or metal compounds in the fissures or pores of a surface while the surface is at a raised temperature, the temperature of the finely divided particles being inserted into the fissures or pores being lower than that of the surface, the temperature differential being such that the particles are relatively contracted in size and the fissures or pores are expanded in size and when equilibrium temperature between the particles and the surface is eventually reached, the walls of the fissures or pores are tightly clasped around the individual particles so as to have a firm or tight grip on the particle. The size of the particles are in the range of 0.05 to 50, preferably 0.5–30 microns and the size of the fissures or pores is in about the same range, but under the raised temperature conditions at the time the particles are being inserted, the dimensions of the fissures are considerably increased. The temperature differential between the particles and the surface is at least 300° F. and preferably at 400° F. with the particles having the lower temperature.

---

This invention relates to the disposition or diffusion of fine particles into porous surfaces and the use of articles made by such techniques and is a continuation of my application Ser. No. 522,362, filed Jan. 24, 1966 and now abandoned, which is a continuation-in-part of my application Ser. No. 414,423 filed Nov. 27, 1964, now abandoned.

The invention further relates to a process for disposing finely-divided solid particles in fissures or pores of surfaces so that they are mechanically locked into the surface by an interference fit effected by suitable temperature differentials.

Briefly, the present invention comprises a first step of treating a surface, usually a metallic surface, to provide a plurality of minute interstices, pores, cavities or fissures on or in the surface. This is accomplished, for instance, by mechanical treatment or pretreatment such as liquid-honing or sand blasting or by chemical means such as acid etching techniques or by forming a porous coating on the surface such as zinc phosphate. If the metallic surface inherently has the desired network of minute fissures or interstices, this first step is, of course, not needed. An example of such a surface would be certain sintered or powdered metal materials or certain sprayed metal surfaces.

As a second step, the treated surface is heated to enlarge the fissures or pores. Then fine particles are disposed on the surface and worked into the enlarged pores as the circumstances require so that the fissures or pores are substantially filled up with the fine particles. The fine particles are at room temperature or below. Lastly, the surface and particles are permitted to reach equilibrium temperature whereby pores and fissures contract and the particles are locked into the pores or fissures by an interference fit.

The portion of the total surface area comprising the entrapped particles may be from about 5 to 75% and preferably is between about 10 to 50%. The surface is discontinous in the sense that it is not completely covered by the particles but instead comprises a multiplicity of particles in what can be characterized as a surface matrix.

The average size of the particles should be between 0.05 to 50, and preferably 0.5 to 30 microns as such is measured and understood in the art. The particle size should be such that the unexpanded particles will enter or can be forced into the fissures in the surface. Theoretically, it is contemplated that the particle size be correlated with the size of the width of the fissures so that there are from one to perhaps five particles across the width of each fissure. The size of the pores or fissures in the surface is preferably of about same order as the particles and in any case should not exceed an average size of 100 microns.

The particles are cooled or the surface is heated or both so that there is a temperature differential between the particles and the surface of at least 300° F. and preferably 400° F. or higher with the particles having the lower temperature.

The temperature differential depends upon the coefficient of expansion of the surface and of the particles, the purpose being to develop sufficient differential to lock in the particles by an interference fit. It is possible to have much larger temperature differentials when desirable. For example, a steel surface could be heated to 1000° F. and particles at room temperature or below applied to it.

The particles are promptly disposed on the heated surface by brushing them on the surface or by applying them in an aqueous dispersion on the surface or by air blasting them on the surface or by employing electrostatic techniques to dispose them on the surface. While the particles generally will fall and arrange themselves in the enlarged interstices, the surface may be rubbed, burnished, scrubbed or otherwise treated to further arrange and dispose the particles in the enlarged fissures.

The surface and particles are then allowed to reach equilibrium temperature. By reason of the initial temperature differential, the particles become entrapped in the surface by an interference fit. In other words, the particles expand in the pores or fissures and the pores or fissures contract and thereby lock the particles in place.

The class of particles with which this invention is concerned are certain metals and metal compounds such as carbides and nitrides. More particularly, it is concerned with expensive and difficulty alloyed metals, sometimes called exotic metals, such as titanium, zirconium, molybdenum, hafnium and selenium and with other materials hereinafter listed.

It is also concerned with metals which have desirable characteristics for one purpose but which, when made up in a solid alloy, impart brittleness, early fatigue, poor thermal properties or other undesirable characteristics to the alloy. By way of example, the following metal or metallic compound particles are contemplated for use in connection with my invention: antimony, barium oxide, barium carbide, beryllium, beryllium oxide, boron nitride, cerium, chromium, cobalt, copper, graphite, hafnium, hafnium carbide, iridium, manganese, molybdenum disulfide, nickel, platinum, rhodium, selenium, silicon carbide, tantalum, titanium, tungsten, tungsten carbide and vanadium.

To further illustrate my invention, graphite and molybdenum disulfide have excellent dryfilm lubricant properties. I contemplate that a steel surface is acid etched to form a multiplicity of fine pores or fissures in it of micron size. The surface is heated to about 350° F. Graphite or molybdenum disulfide particles of less than 30 micron average particle size at room temperature or preferably below room temperature are disposed on the surface and enter into the expanded fissures. Upon cooling, the graphite or molybdenum disulfide particles are locked into the surface by an interference fit. The surface thus has greatly improved lubricating properties and is use as a ball bearing race or other application where there is a need for lubricating properties.

Rhodium is used as an alloy for pen points. I contemplate making a pen point in which rhodium particles are disposed in the point of a pen by my process in place of an alloy, thereby saving rhodium and obtaining a pen point equivalent to a pure rhodium pen point at a substantial saving of rhodium.

Platinum is a catalyst for a number of chemical reactions. I contemplate disposing platinum particles in sintered glass beads or cylinders having a porous surface by my process to make inexpensive catalyst material. The particles in the surface are available to act as a catalyst. The body of the material however, is relatively inexpensive and is not solid catalyst as now required.

Steel surfaces are sometimes plated with alpha brass to improve the adhesion of rubber to such surfaces. I contemplate preparing a surface with a multiplicity of alpha brass particles disposed in the pores thereof by an interference fit and adhering rubber to that surface to thereby obtain most if not all of the advantage of the advantage of the alpha brass without a complicated plating operation.

Copper has become relatively expensive. Sheet steel is being clad with a thin layer of copper in which the copper and steel are rolled together at high pressure. I contemplate first treating the steel with copper particles in accordance with my invention to improve the bond between the copper and steel and facilitate the cladding operation.

For electrical contacts, surfaces of silver or other metals are employed. I contemplate disposing silver particles in a copper or other metallic surface and thereby obtaining an electrical contact surface substantially the same as pure silver.

Alloys of various exotic metals are often desired for use as catalysts because they have unusual effects. I contemplate forming an alloy in situ by first forming a multiplicity of fissures in a surface, then disposing metal particles in them, and then heating the surface hot enough to fuse the particles into the surface to form the alloy. With the particles locked into the surface by an interference fit, the surface will withstand rough handling or even drawing or other deforming operations until the alloy is formed in situ by fusion. Here the temperature differential is only that required to position the particles prior to the point at which the in situ alloy is formed. Generally, however, in accordance with my invention the particles are not fused before their introduction into the fissures because such destroys the interference fit. In other words, I rely upon the coefficient of expansion characteristics of solid materials to obtain my interference fit. Fused materials or even softened materials do not have the same characteristics and I therefore avoid fusing or softening the particles in practicing my invention.

I contemplate the formation of abrasive surfaces in the nature of fine emery cloth or hard wearing surfaces by disposing tungsten carbide or silicon carbide particles in fissures by an interference fit in accordance with my invention.

In still another aspect of my invention, I contemplate depositing fine copper particles in a steel, aluminum or stainless steel surface or fine iron particles in a stainless steel, aluminum or copper surface for the purpose of achieving unusual decorative effects. For instance, the outside of office buildings are sometimes sheathed with stainless steel or aluminum. Fine iron or copper particles disposed on such surfaces in accordance with my invention would weather to a rust brown and give a very interesting effect while preserving all of the advantages of the stainless steel. Likewise, fine copper particles could be treated to blue-green or other colors known to the art and produce unusual effects. This is particularly applicable to aluminum surfaces for which at present only a few permanent anodized colors are available.

As already noted, the temperature differential should be sufficient to provide a suitable interference fit taking into consideration the coefficient of expansion of the surface of application and the particles being applied thereto. Minimum interference fits are in the order of about .003" and preferably exceed this amount. To achieve such differential, the particles can be applied at room temperature (about 60° F.) or preferably below room temperature when applied to the metal surface. Particles may be cooled to about —100° F. by means of Dry Ice or solid carbon dioxide to retard their expansion until compaction into the fissures is achieved. Liquid nitrogen or other liquid gases permit attainment of particle temperatures below —400° F. may also be employed to obtain the required temperature differential. Alternatively, I can keep the particles in the freezer of an ice box or deep freeze apparatus.

The surface to which the particles are to be applied may be treated in several ways to make it porous or provide a number of fissures or interstices into which the particles are fitted. As will be apparent to those skilled in the art, the surface may be electroetched by anodic or cathodic treatments in an acid or alkaline solution varied to suit the particular metal involved. Non-electrolytic chemical treatments formulated from acid or alkaline material, operated either cold or hot, are very effective because of the uniformity of fissure formation and obviate the effects of different current densities on the items processed.

Alternatively, the surface may be treated with a suitable phosphate coating bath to form an integral phosphate coating on it, such coatings having a plurality of minute fissures in them.

The surface may be plated with electroless nickel, hard chromium, or other coatings known in the art and then such coating suitable treated to form a porous surface. Aluminum surfaces may be anodized or hard anodized.

If desired, the surface may be burnished while still hot with a rotating steel brush, felt pads, fiber brush or other suitable means to further compact the particles in the fissures and to remove loss particle material not within the fissures, leaving alternate, random, surface areas of clean metal and particles which I characterize as a discontinuous surface. I also contemplate that the particles may be deposited onto the surface and forced into the fissures by air blast techniques. Vibrator devices may be applied to the surface to work the particles into the pores or fissures.

In disposing the particles onto the treated surface and compacting or forcing the particles into the fissures in such surface, every effort should be made to complete all steps in the operation before the surface cools to any significant extent and before the particles likewise heat up. In other words, the temperature differential should be maintained and the treatment effected expeditiously.

The surface of application may be heated in an oven by conventional means. I also contemplate that it be heated by high frequency induction heating. High frequency induction heating. High frequency induction heating provides a means for heating on the superficial surface to controllable depths and temperatures. The fissured surface could thus be heated to achieve a large temperature differential without over heating the main body of the article being processed. I even contemplate use of high frequency induction heating to cause melting of the fissured surface and particles to form in situ alloys as previously described.

The invention claimed is:
1. A process which comprises incorporating solid fine elemental metal particles or metal compound particles having an average particle size of less than 50 microns into a surface characterized by a multiplicity of minute pores of fissures formed therein said pores or fissures having a dimension not exceeding 100 microns but being of sufficient size to allow the particles to be inserted therein under temperature conditions whereby said particles are disposed into pores or fissures in said surface at a temperature at least 300° F. below the temperature of said surface so that when the particles and surface reach the same or an equilibrium temperature, the particles are locked into said pores or fissures, said metal compound being selected from the class consisting of metal oxides, nitrides, carbides and disulfides.
2. The process of claim 1 above in which the particles are cooled to at least $-100°$ F.
3. The process of claim 1 above in which the temperature differential is at least 400° F.
4. The process of claim 1 in which the particles are metallic carbide.
5. The process of claim 1 in which the particles are a metal selected from the class consisting of antimony, beryllium, cerium, chromium, cobalt, copper, hafnium, iridium, manganese, nickel, platinum, rhodium, selenium tantalum, titanium, tungsten and vanadium.
6. An article comprising a surface with a plurality of minute pores or interstices therein, said interstices or pores containing particles of metal or compounds of metal therein, the surface area occupied by said particles amounting to about 5 to 75% of such surface area, the average size of said particles being less than 50 microns, said particles being held in said pores or interstices by an interference fit effected by a differential in temperature between said surface and said particles when said particles were disposed in said interstices or pores, said metallic compound being selected from the class consisting of metal oxides, nitrides, carbides and disulfides.
7. A process of forming an in situ alloy in a metallic surface comprising the steps of forming a multiplicity of pores in said surface having a dimension not exceeding 100 microns but being of sufficient size to receive particles therein of no more than 50 microns, heating said surface to at least 212° F., disposing alloying metal particles in said pores in said surface, said particles being at a temperature of room temperature or lower, and heating said surface to fuse said particles and form an in situ alloy of said particles with the base metal of the surface.
8. The process of claim 1 in which the particles are graphite.
9. The process of claim 1 in which the particles are molybdenum disulfide.

References Cited
UNITED STATES PATENTS

| | | | |
|---|---|---|---|
| 706,701 | 8/1902 | Thurston | 117—31 |
| 706,702 | 8/1902 | Thurston | 117—31 |
| 986,645 | 3/1911 | Rossi | 117—31 |
| 2,887,420 | 5/1959 | Llewelyn et al. | 117—22 X |
| 2,961,312 | 11/1960 | Elbaum | 117—22 X |
| 2,963,782 | 12/1960 | Donnelly | 117—22 |

WILLIAM D. MARTIN, Primary Examiner

P. F. ATTAGUILE, Assistant Examiner

U.S. Cl. X.R.

117—31, 49